United States Patent
Okada et al.

(10) Patent No.: US 10,514,846 B2
(45) Date of Patent: Dec. 24, 2019

(54) COMPUTER SYSTEM AND MANAGEMENT METHOD FOR COMPUTER

(71) Applicant: HITACHI, LTD., Tokyo (JP)

(72) Inventors: Wataru Okada, Tokyo (JP); Yoshinori Ohira, Tokyo (JP); Nobuhiro Maki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/552,814

(22) PCT Filed: Jun. 1, 2015

(86) PCT No.: PCT/JP2015/065720
§ 371 (c)(1),
(2) Date: Aug. 23, 2017

(87) PCT Pub. No.: WO2016/194096
PCT Pub. Date: Dec. 8, 2016

(65) Prior Publication Data
US 2018/0032254 A1    Feb. 1, 2018

(51) Int. Cl.
*G06F 3/06*    (2006.01)
*G06F 13/10*    (2006.01)
(Continued)

(52) U.S. Cl.
CPC ............ *G06F 3/0604* (2013.01); *G06F 3/065* (2013.01); *G06F 3/0664* (2013.01);
(Continued)

(58) Field of Classification Search
None
See application file for complete search history.

(56) References Cited

U.S. PATENT DOCUMENTS 7,945,760 B1    5/2011    Barry et al.
2006/0023527 A1    2/2006    Arakawa et al.
(Continued)

FOREIGN PATENT DOCUMENTS

JP    2006039976 A    2/2006
JP    2009245387 A    10/2009
(Continued)

OTHER PUBLICATIONS

International Search Report of PCT/JP2015/065720 dated Aug. 18, 2015.

*Primary Examiner* — Edward J Dudek, Jr.
*Assistant Examiner* — Ralph A Verderamo, III
(74) *Attorney, Agent, or Firm* — Mattingly & Malur, PC

(57) ABSTRACT

A configuration aimed at reducing loads on storage apparatuses at a restoration site is provided in an environment where there are differences in the performance and capacity of the storage apparatuses between a primary site and the restoration site. Second volumes which form a remote copy with first volumes provided to a host at a primary site are located in a storage apparatus at the restoration site, which can satisfy the performance requirement upon failure of the first volumes, on the basis of performance information and available capacity information. A volume group is configured for each of the second volumes located at one storage apparatus at the restoration site and the first volumes; and an extended volume group including a plurality of second volumes, in which data is replicated and recorded in a write order to write the data to the first volumes, and their first volumes is set.

16 Claims, 10 Drawing Sheets

(51) Int. Cl.
*G06F 13/12* (2006.01)
*G06F 11/07* (2006.01)
*G06F 11/14* (2006.01)
*G06F 11/20* (2006.01)

(52) U.S. Cl.
CPC .......... *G06F 11/0727* (2013.01); *G06F 11/14* (2013.01); *G06F 11/2058* (2013.01); *G06F 11/2069* (2013.01); *G06F 11/2097* (2013.01); *G06F 13/10* (2013.01); *G06F 13/12* (2013.01); *G06F 3/067* (2013.01)

(56) References Cited

U.S. PATENT DOCUMENTS

2007/0233981 A1* 10/2007 Arakawa ............. G06F 11/2064
711/162
2009/0248953 A1   10/2009 Satoyama et al.
2011/0055501 A1    3/2011 Wake
2011/0078395 A1    3/2011 Okada et al.

FOREIGN PATENT DOCUMENTS

JP     2011048500 A    3/2011
JP     2011076286 A    4/2011

* cited by examiner

Storage Node Management Table (1751)

| Site ID | Storage Node ID | Capacity | Available Capacity | Performance | Surplus Performance |
|---|---|---|---|---|---|
| 100 | 100 | 10TB | 5TB | 3MIOPS | 1MIOPS |
| 100 | 101 | 25TB | 20TB | 2MIOPS | 1MIOPS |
| ... | | | | | |

Volume Management Table (1752)

| Storage Node ID | Volume ID | Capacity |
|---|---|---|
| 100 | 1 | 100G |
| 100 | 2 | 200G |
| ... | | |

Host Computer Management Table (1753)

| Host Computer ID | Volume ID | Storage Node ID | Performance Requirement | Post-DR Performance Requirement |
|---|---|---|---|---|
| 100 | 1 | 1 | 100IOPS | 50IOPS |
| 100 | 2 | 1 | 100IOPS | 100IOPS |
| ... | | | | |

Copy Pair Management Table (1754)

| Pair ID | Primary Volume ID | Primary Storage Node ID | Secondary Volume ID | Secondary Storage Node ID |
|---|---|---|---|---|
| 100 | 1 | 1 | 11 | 10 |
| 101 | 2 | 1 | 12 | 10 |
| ... | | | | |

FIG.6

Volume Group Management Table (1755)

| Volume Group ID | Storage Node ID | Volume ID | JNL volume ID | JNL Management |
|---|---|---|---|---|
| 100 | 1 | 1,2 | 5 | Yes |
| 100 | 2 | 1,2,3 | - | No |
| ... | | | | |

FIG.7

Extended Volume Group Management Table (1756)

| Extended Volume Group ID | Volume Group ID | Master Storage Node ID |
|---|---|---|
| 100 | 100,101 | 100 |
| 101 | 200 | 200 |
| ... | | |

FIG.8

Inter-node Connection Management Table (1757)

Virtual Storage Management Table (1758)

COMPUTER SYSTEM AND MANAGEMENT METHOD FOR COMPUTER

TECHNICAL FIELD

The present invention relates to a computer system and its management method.

BACKGROUND ART

In recent years, computer systems have become a vital foundation for corporate activities. Even when a breakdown of a system happens due to, for example, a disaster, an important issue is to promptly restore the system to its normal condition. For example, there is a technique that guarantees consistency of data between a plurality of volumes by performing remote copying of the data from a host computer to a remote place in the order of writing data to each of a plurality of volumes belonging to one volume group in order to restore the system using the plurality of volumes to its normal condition. Furthermore, there is a technique that guarantees the consistency of data between volumes across a plurality of storage apparatuses (for example, see PTL 1).

Meanwhile, there is a technique that flexibly increases or decreases an amount of resources by coupling a plurality of storage apparatuses which have a function sorting read/write commands and management commands, and making the coupled storage apparatuses operate as a single virtual storage apparatus (for example, see PTL 2).

CITATION LIST

Patent Literature

PTL 1: U.S. Pat. No. 7,945,760
PTL 2: Japanese Patent Application Laid-Open (Kokai) Publication No. 2009-245387

SUMMARY OF THE INVENTION

Problems to be Solved by the Invention

Since management is required for the order guarantee of each volume group, it is desirable that the number of volume groups should be small and the volume groups should be set in a wide range in order to utilize resources efficiently.

There may often be differences in the performance and capacity of storage apparatuses used at a normal work site and at a remote site for restoration, which are located at different bases, depending on their sites. Furthermore, the storage apparatuses at the restoration site may sometimes adopt the virtual storage apparatus configuration as described in PTL 2 in order to use the resources efficiently.

If the volume groups are set in a wide range in the above-described case without considering the environment at a secondary site, it can be assumed that it may become necessary to transfer data between the storage apparatuses at the secondary site. Since the data transfer between the apparatuses consumes many resources, there is a possibility that input-output performance of the storage apparatuses and performance of the remote copy may degrade.

Therefore, the important issue is how efficiently the volume groups should be set within the range of performance requirements required during fallback operation upon restoration from a failure.

Means to Solve the Problems

In order to solve the above-described problems, the present invention discloses a management method for a computer system including at least one first storage apparatus and a plurality of second storage apparatuses, wherein the management method includes: setting a plurality of second volumes in the plurality of second storage apparatuses to form a remote copy pair with a plurality of first volumes provided by the first storage apparatus; setting an extended volume group including the plurality of first volumes and the plurality of second volumes; and replicating and recording data, which are stored in the plurality of first volumes, between the plurality of second volumes included in the extended group in a write order to write the data to the plurality of first volumes. Furthermore, the method includes: managing performance information and available capacity information of the plurality of second storage apparatuses and required performance upon failure of the plurality of first volumes; locating the second volumes in the second storage apparatus capable of satisfying the performance requirement upon failure of the first volumes which form the remote copy pair, on the basis of the performance information and the available capacity information of the second storage apparatuses; and configuring a volume group for each of the second volumes, which are located in one of the second storage apparatuses, and the first volumes constituting a remote copy with those second volumes.

Advantageous Effects of the Invention

The remote copy configuration which will not impose wasteful loads on a storage apparatuses at a restoration site can be created in an environment where there are differences in the performance and capacity of the storage apparatuses between the site where the business is conducted in normal times, and the restoration site.

BRIEF DESCRIPTION OF DRAWINGS

FIG. 3 is a table illustrating an example of storage node management information 1751;

FIG. 4 is a table illustrating an example of volume management information 1752;

FIG. 5 is a table illustrating an example of host computer management information 1753;

FIG. 6 is a table illustrating an example of copy pair management information 1754;

FIG. 7 is a table illustrating an example of volume group management information 1755;

FIG. 8 is a table illustrating an example of extended volume group management information 1756;

DESCRIPTION OF EMBODIMENTS

Figure 1:
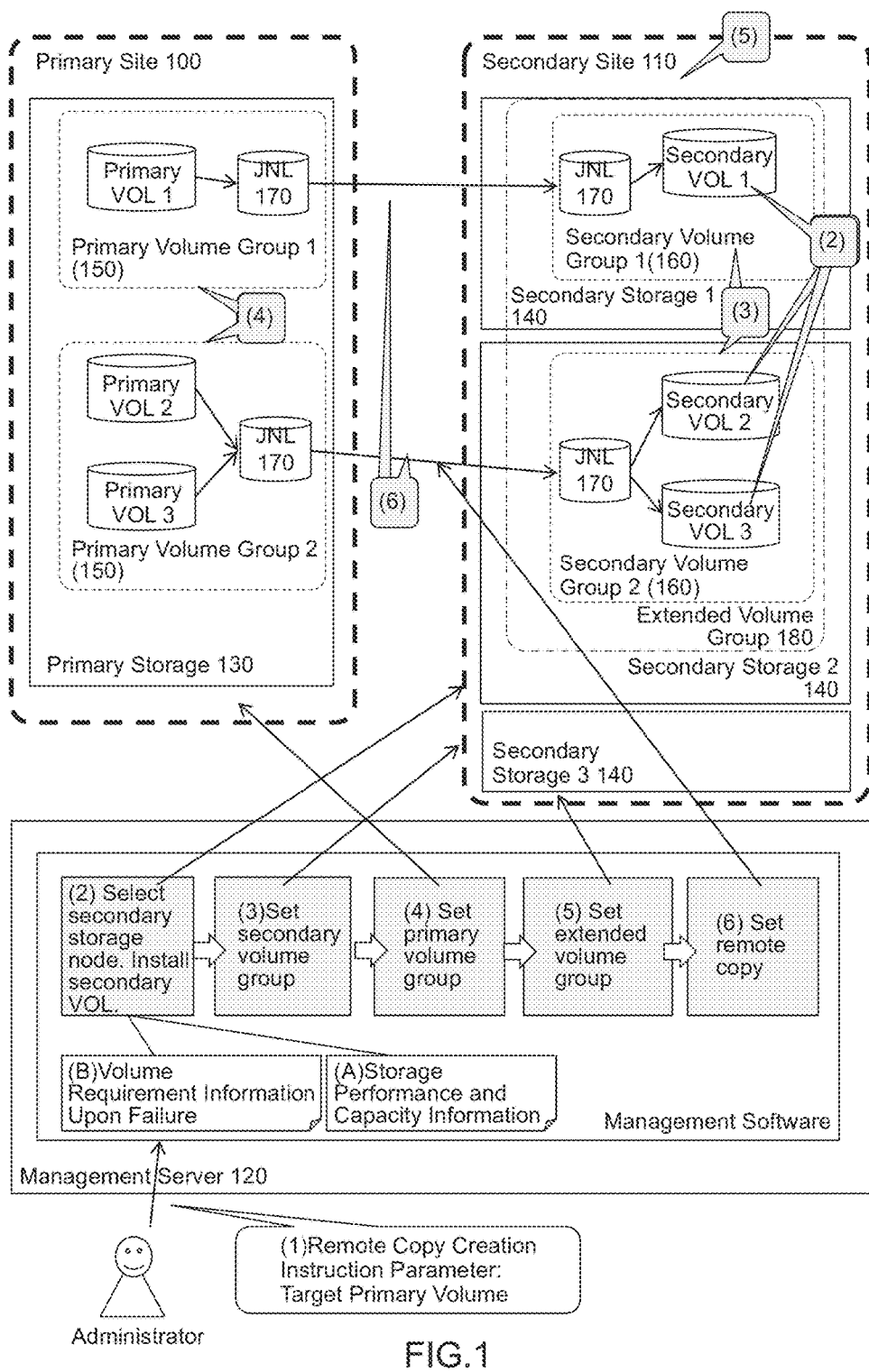
FIG. 1 is a diagram illustrating the outline of the present invention.

Embodiments of the present invention will be explained by using examples. Incidentally, each example is to explain features of the present invention and does not limit the present invention. In this embodiment, sufficiently detailed explanations will be given for those skilled in the art to implement the present invention; however, it is necessary to understand that other implementations and forms are also possible and changes of the configurations and structures and replacements of various elements are possible without departing from the scope of technical ideas and spirits of the present invention.

Components of a certain example can be added to another example or can be replaced with components of another example with the range not departing from the scope of technical ideas of the present invention. The embodiments of the present invention may be mounted in software which operates on a general-purpose computer, or may be mounted in dedicated hardware or in a combination of software and hardware.

Incidentally, in the following explanation, information used in this embodiment will be explained mainly in a "table" format; however, the information does not necessarily have to be expressed in a data structure of tables and may be expressed in data structures of lists, DB, queues, etc., and other data structures.

When each processing in the embodiments of the present invention is explained by referring to a "program" as a subject (operation subject), the program executes defined processing as the program is executed by a processor by using a memory and a communication port (communication control unit). So, the processor may be used as a subject for the explanation.

Furthermore, processing disclosed by referring a program as a subject may be processing executed by a computer such as a management computer, or a storage system. Some or all of programs may be implemented in dedicated hardware or may be modularized.

Information such as programs, tables, files, etc. for implementing each function can be stored in storage devices such as nonvolatile semiconductor memories, hard disk drives, and SSDs (Solid State Drives), or computer-readable non-transitory data storage media such as IC cards, SD cards, and DVDs and may be installed in computers or computer systems by means of program distribution servers or non-transitory storage media.

Furthermore, in this embodiment, a control program at a storage node and a management program at a management server transmit and receive instructions to each other; and in this case, it is assumed that a general network protocol is used for such transmission and reception of the instructions. For example, when communications according to TCP/IP is performed, it is assumed that destination addresses, port numbers, etc. for establishing mutual communications are set. However, the use of any special protocol for, for example, streamlining of communications shall not be excluded.

The outline of the invention will be explained with reference to FIG. 1. A computer system illustrated in this drawing is composed of: a primary site 100 to conduct normal work, a secondary site 110 to stand by for restoration when cessation of business occurs at the primary site 100 due to, for example, a disaster; and a site to which a management server 120 for managing the above-mentioned two sites belongs. A storage node belonging to the primary site will be referred to as a primary storage apparatus 130 and a storage node belonging to the secondary site will be referred to as a secondary storage apparatus 140. A group to guarantee the order property of data updates between volumes when copying data from the primary storage apparatus 130 to the secondary storage apparatus 140 will be referred to as a volume group. Particularly, a volume group belonging to the primary storage apparatus will be referred to as a primary volume group 150 and a volume group belonging to the secondary storage group will be referred to as a secondary volume group 160. A copy pair constituted by the primary storage apparatus 130 and the secondary storage apparatus 140 has the correspondence relationship between a primary volume at a copy source and a secondary volume at a copy destination. Furthermore, a buffer area for storing control information to guarantee an update order between volumes within this volume group will be referred as a journal volume (JNL volume) 170. A group of volume groups which guarantee the update order across the volume groups will be referred to as an extended volume group 180.

When settings of the correspondence relationship (copy pairs) between the primary volumes and the secondary volumes, the volume groups 150, 160 to which each volume belongs, the journal volumes 170 used there, and the extended volume group 180 are defined, each storage node can perform remote copy control to guarantee the update order across the volume groups 1 and 2.

The management server functions as a management unit by having a CPU execute management software for managing each of the storage nodes. This management software manages the performance and capacity information of each storage node ((A) in FIG. 1). Moreover, the management server manages performance requirements upon restoration with respect to each primary volume at the time of a disaster ((B) in FIG. 1).

When an administrator who manages the computer system creates a remote copy configuration, they enter a primary volume for a remote copy pair to the management server ((1) in FIG. 1). The management server 120 acquires the performance requirement upon restoration of the entered volume at the time of a disaster from management information (B). Then, the management server 120 finds a storage apparatus capable of satisfying the acquired performance requirement from management information (A) and sets a secondary volume in the found storage apparatus ((2) in FIG. 1). Subsequently, the management server 120 groups the secondary volumes, which are then set, with respect to each secondary storage apparatus 150 and sets them as a secondary volume group 160 ((3) in FIG. 1). Then, the management server 120 sets a primary volume group 150 by using a group of primary volumes corresponding to the secondary volumes belonging to this secondary volume group 160 ((4) in FIG. 1). The management server 120 groups all the then-set secondary volumes and sets them as an extended volume group 180 ((5) in FIG. 1). Lastly, the management server 120 sets a JNL volume 170 in each volume group in order to start remote copying and then starts copying ((6) in FIG. 1).

Regarding write data from a host computer, time when data is written is managed by the primary storage node 1. The data-written time is transferred to a secondary storage node 3 and stored in the JNL volume 170 of the secondary storage apparatus. Subsequently, the secondary storage node stores the write data in the JNL volume into the secondary volumes in the order of the associated data-written time by referring to the time when the data is written. This configuration provides the order guarantee between volumes in the secondary volume group to store the data.

When a failure occurs, the business will be restored at the secondary site. When this happens, the management server issues an instruction to the secondary storage apparatus (140) to configure the volumes belonging to the extended volume group as a single virtual storage apparatus. Then, I/O is issued to this virtual storage apparatus, thereby resuming the business.

Embodiment 1

Figure 2:
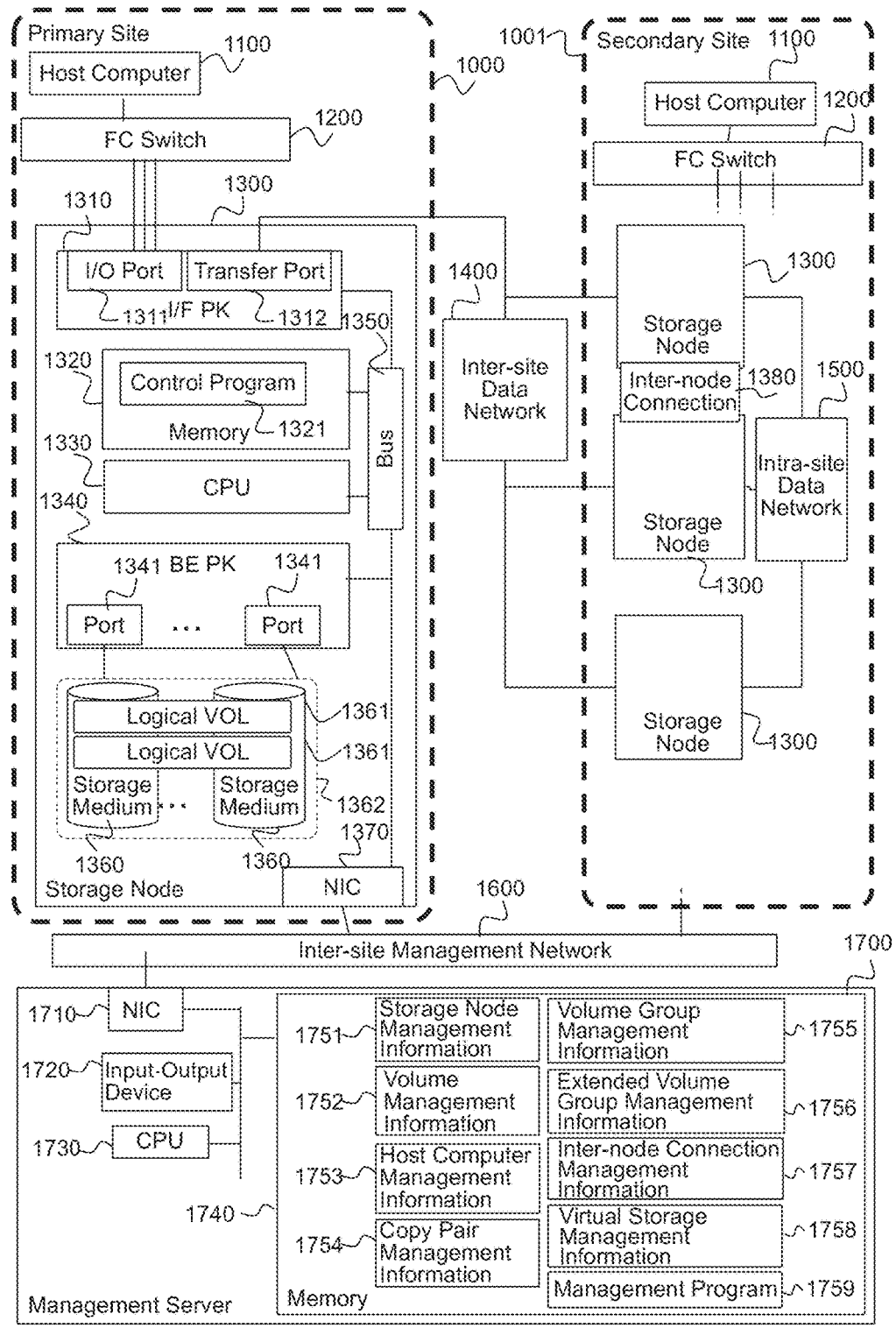
FIG. 2 is a configuration example of a computer system according to a first embodiment to which the present invention is applied.

FIG. 2 is a configuration example of a computer system to which the present invention is applied. This computer system is composed of a primary site 1000, a secondary site 1001, and a site to which a management server 1700 for managing the above-mentioned two sites belongs. The primary site and the secondary site are connected via an inter-site data network 1400. Furthermore, the primary site, the secondary site, and the site to which the management server belongs are connected by an inter-site management network 1600.

A network composed of a SAN or IP configured according to the Fibre Channel is assumed as the inter-site data network or the inter-site management network; however, the inter-site data network or the inter-site management network may be of any other forms as long as it is a network capable of communicating data and management instructions between the sites.

The site to which the management server belongs may be the same site as either the primary site or the secondary site as long as it can communicate with both the primary site and the secondary site during normal operation and can communicate with at least the secondary site upon the occurrence of a failure.

The primary site is composed of: a host computer 1100 where applications for performing tasks operate; a storage node 1300 for storing data treated by the applications; and an FC switch 1200 for connecting the host computer and the storage node. The host computer is a generally used computer and is composed of a CPU, a memory, storage devices, input-output devices, and so on. The storage devices are, for example, hard disk drives. The input-output devices are, for example, a mouse, a keyboard, and a display. Furthermore, the host computer is equipped with an interface (I/F) for connecting to the storage node.

The storage node is composed of an I/F PK 1310, a memory 1320, a CPU 1330, a BE PK 1340, a bus 1350, storage media 1360, and an NIC (Network Interface Card) 1370. The I/F PK is equipped with an I/O port 1311 for connecting to the host computer and a transfer port 1312 for connecting to another storage node. These ports may exist in separate I/F PKs. The host computer and the storage node may be connected directly or a switch such as the FC switch 1200 may be introduced to connect to more host computers and storage nodes, thereby forming a network. The transfer port is connected to a storage node at another site via the inter-site data network 1400.

The BE PK 1340 is equipped with ports 1341 for communicating with the storage media 1360 mounted in the storage node. The storage medium 1360 is a storage area connected to this port and may be a hard disk drive or an SSD.

A control program 1321 is mounted in the memory. The control program 1321 is a program which defines, for example, processing for providing basic functions as the storage node, such as processing for accepting the data input-output commands from the host computer, reading data from an appropriate storage area, and writing data to an appropriate storage area, and processing for performing the aforementioned remote copying. Furthermore, the control program is also equipped with a function that creates a configuration generally called a RAID (Redundant Arrays of Inexpensive Disks) which groups a plurality of HDDs and forms logical volumes 1361 across the HDDs belonging to that group in order to enhance reliability of data storage and increase the speed of input-output processing. Regarding the RAID, a group of storage media is called a parity group 1362. Incidentally, the CPU reads this control program and executes the processing.

The NIC serves as an I/F for connecting to the inter-site management network. Generally, a switch or the like is used for connection, but the NIC may be directly connected to the management server or other storage nodes.

A host computer 1100, an FC switch 1200, and a storage node 1300 which are used for restoration belong to the secondary site. They have basically the same configuration as that of the primary site. However, the storage nodes may be connected via an inter-node connection 1380 and an intra-site data network 1500. The connection between the storage nodes is a connection to transmit and receive data and commands between the nodes at high speeds by directly connecting buses. On the other hand, the intra-site data network is a network for connecting the storage nodes by using transfer ports.

The management server is composed of an NUC 1710, an input-output device 1720, a CPU 1730, and a memory 1740.

The NIC is an I/F for connecting to the inter-site management network. The input-output device is, for example, a mouse, a keyboard, a display, and so on. The memory is equipped with necessary management information to implement the present invention, that is, storage node management information 1751, volume management information 1752, host computer management information 1753, copy pair management information 1754, volume group management information 1755, extended volume group management information 1756, inter-node connection management information 1757, and virtual storage management information 1758. Furthermore, the NIC is also equipped with a management program 1759 having a function implementing the present invention in addition to basic functions managing the storage node. The CPU reads this management program and executes processing while referring to the above-mentioned management information as necessary.

The basic configuration has been explained above; however, pluralities of primary sites and secondary sites may exist as another configuration. Moreover, a plurality of storage nodes may exist at the primary site. Furthermore, the functions of the management server may be installed in the storage node(s). Furthermore, the storage node may be hardware configured exclusively for a storage apparatus or may be a storage node operated by mounting the control program in a general computer. The host computer may be a virtual server configured by a virtualization function of the server. Furthermore, the storage node may be a storage node in which the control program may be operated virtually on the server.

Each of the inter-site management network, the inter-site data network, the intra-site data network, the inter-node connection, and the network between the host computer and the storage node may not be a mutually independent network.

FIG. 3 is a resource management table 1751 illustrating an example of the storage node management information 1751. A site ID (T100) is an ID for identifying a site. A storage node ID (T110) is an ID of a storage node which belongs to the site indicated by the site ID. A capacity (T120) is the entire capacity capable of storing data in the storage node indicated by the storage node ID. An available capacity (T130) is a capacity which has not been allocated from among the capacity (T120). Performance (T140) is performance of the storage node indicated by the storage node ID. There are some possible methods for expressing this value. For example, the minimum achievable number of inputs and outputs per second (IOPS) or the clock number of the CPU which executes the processing may be used. Therefore, the performance is expressed by using the IOPS in this embodiment, but the expression method is not limited to this. Surplus performance (T150) is performance which has not been allocated from among the performance (T140). It is assumed that these values are collected from each storage node by the management program in advance.

FIG. 4 is an example of the volume management information 1752. A storage node ID (T210) is an ID for identifying a storage apparatus. A volume ID (T220) is an ID of a volume which belongs to the storage apparatus indicated by the storage node (T210). A capacity (T230) is a capacity of the volume indicated by the volume ID (T220). It is assumed that these values are collected from each storage node by the management program in advance.

FIG. 5 is an example of the host computer management information 1753. A host computer ID (T310) is an ID for identifying a host computer. A volume ID (T320) is an ID representing a volume used by the host computer indicated by the host computer ID (T310). A storage node ID (T330) is an ID of a storage node to which the volume used by the host computer indicated by the host computer ID (T310) belongs. A performance requirement (T340) is a performance requirement required for the volume indicated by the volume ID (T320). The performance requirement (T340) is expressed with the IOPS in this embodiment. A post-DR (Disaster Recovery) performance requirement (T350) is a performance requirement of a volume required during fallback operation upon restoration from a failure at the primary volume indicated by the volume ID (T320). Specifically speaking, in order to avoid insufficient performance and insufficient capacity during a period of time when the business will be continued at the secondary site, the post-DR performance requirement is managed in advance and the volume group is set so that such requirement can be fulfilled. Therefore, the post-DR performance requirement is the performance required for the secondary volume which constitutes a remote copy pair with the primary volume. In this embodiment, the post-DR performance requirement (T350) is expressed with the IOPS. Incidentally, when the host computer uses a plurality of volumes, definitions will be made for each volume by using a plurality of records. These values can be set to the host computer by the administrator in advance.

FIG. 6 is an example of the copy pair management information 1754. A pair ID (T410) is an ID for identifying a copy pair. A primary volume ID (T420) is an ID representing a primary volume of the copy pair indicated by the pair ID (T410). A primary storage node ID (T430) is an ID representing a storage node to which the volume indicated by the primary volume ID (T420) belongs. A secondary volume ID (T440) is an ID representing a secondary volume of the copy pair indicated by the pair ID (T410). A secondary storage node ID (T450) is an ID representing a storage node to which the volume indicated by the secondary volume ID (T440) belongs. These values are set during processing for constructing the remote copy configuration.

FIG. 7 is an example of the volume group management information 1755. A volume group ID (T510) is an ID for identifying a volume group. The volume group can be configured so that it may extend across storage nodes depending on the connection status between the storage nodes. Therefore, the volume group ID (T510) is controlled to maintain a unique value in the entire computer system. A storage node ID (T520) is an ID of a storage node which belongs to the volume group indicated by the volume group ID (T510). A volume ID (T530) is an ID of a volume which belongs to the storage node indicated by the storage node ID (T520) and belongs to the volume group indicated by the volume group ID (T510). When a plurality of volumes belong, a plurality of volume IDs can be set. A JNL volume ID (T540) is an ID of a volume used as a JNL volume for the volume group indicated by the volume group ID (T510). When a plurality of volumes are used, a plurality of JNL volume IDs can be set. Regarding JNL management (T550), a flag indicating whether a journal used by the volume group indicated by the volume group ID (T510) should be managed at the storage node indicated by the storage node ID (T520) is set. When the journal should be managed, "Yes" is set; and when the journal should not be managed, "No" is set. When a plurality of storage nodes belong to the volume group, the value is set for each storage node by using a plurality of records. Alternatively, these values may be set during the processing for constructing the remote copy configuration.

FIG. 8 is an example of the extended volume group management information 1756. An extended volume group ID (T610) is an ID for identifying an extended volume group. A volume group ID (T620) indicates an ID of a volume group. When a plurality of volume groups belong, IDs of the plurality of volume groups can be set. A master storage node ID (T630) indicates a storage node which checks to which data of which time in each volume group a duplicate volume can be updated between the volume groups belonging to the extended volume group ID (T610), selects the oldest time from among the checked updatable times, and issues an instruction to update the duplicate volume in each volume group until the time not beyond the selected time.

Figure 9:
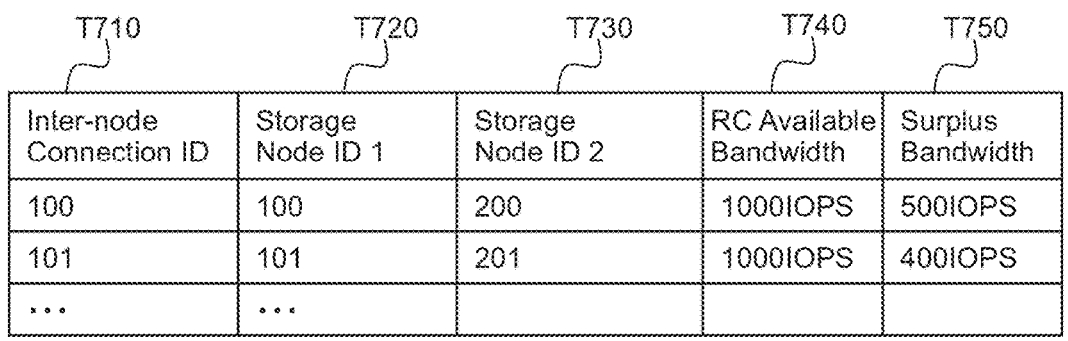
FIG. 9 is a table illustrating an example of inter-node connection management information 1757.

FIG. 9 is an example of the inter-node connection management information 1757. An inter-node connection ID (T710) is an ID for identifying an inter-node connection. A storage node ID1 (T720) and a storage node ID2 (T730) indicate IDs of storage nodes which are connected to each other. An RC available bandwidth (T740) indicates an available bandwidth for a remote copy in the connection indicated by the inter-node connection ID (T710). There are some possible methods for expressing this bandwidth; however, the bandwidth is expressed with the IOPS in this embodiment. A surplus bandwidth (T750) indicates an unallocated bandwidth among the RC available bandwidth (T740). This value is expressed with the IOPS. These values can be collected from each storage node by the management program in advance.

Figure 10:
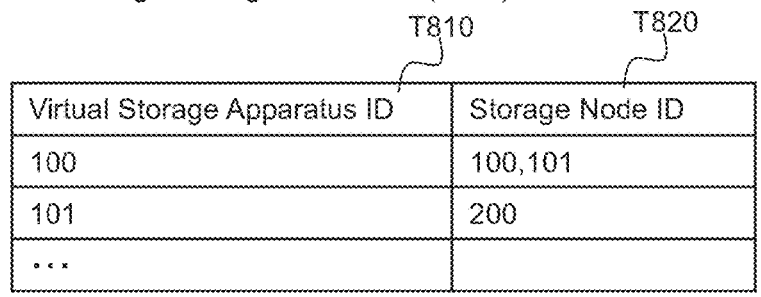
FIG. 10 is a table illustrating an example of virtual storage management information 1758.

FIG. 10 is an example of the virtual storage management information 1758. A virtual storage apparatus ID (T810) is an ID for identifying a virtual storage apparatus when the virtual storage apparatus is created by using a plurality of storage nodes connected via the intra-site data network or the inter-node connection. A storage node ID (T820) is an ID(s) of a storage node(s) which constitutes the virtual storage apparatus indicated by the virtual storage apparatus ID (T810).

The management software sets which other storage node (s) is used to configure a virtual storage apparatus, to each storage node in accordance with the defined virtual storage management information. When a storage node which has received this instruction receives an input-output command to volumes of another storage node belonging to the same virtual storage apparatus, the input-output command is transferred to that storage node via the intra-site data network or the inter-node connection, thereby completing the processing.

Figure 11:
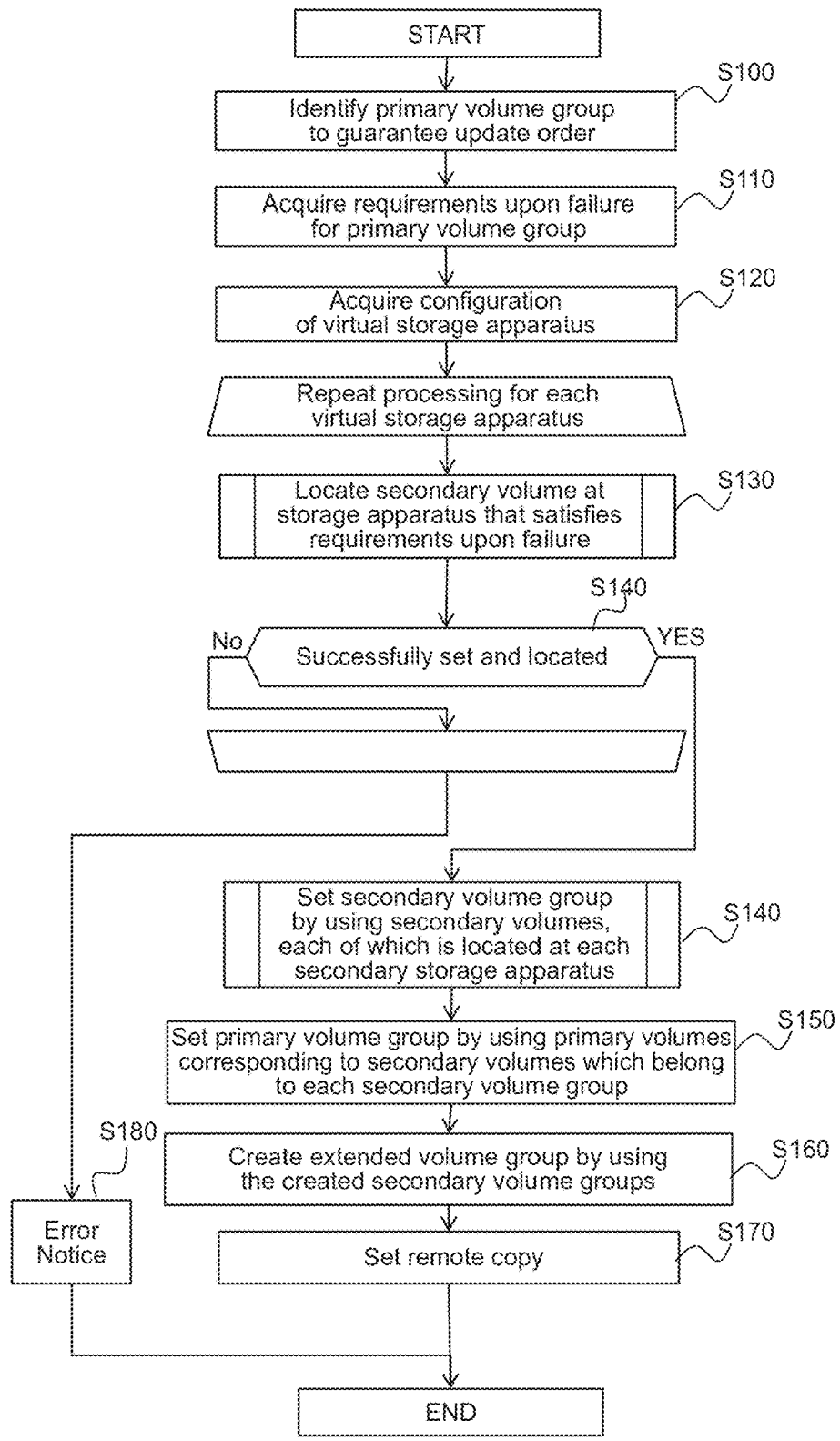
FIG. 11 is an example of a flow illustrating a processing sequence for constructing a remote copy configuration.

FIG. 11 illustrates an example of the remote copy configuration constructing processing by the management program 1759. This processing is executed by activation of the management program 1759 by the CPU 1730 according to, for example, the administrator's instruction. When activating the management program 1759, the administrator notifies the CPU 1730, which executes the management program 1759, of the ID of the host computer 1100 which uses a target volume of a remote copy for the management server. Incidentally, the ID of the host computer which is then reported may be more than one.

The management program 1759 which has received the above-described notice identifies one or more volumes, which are used as a target(s) of the input-output request of the relevant host computer from the reported ID of the host computer, according to the volume ID (T320) of the host computer management table 1753 and sets them as a primary volume(s) of a remote copy pair composed of these volumes (S100). Next, the management program 1759 acquires the performance requirement (T340) and the post-DR performance requirement (T350) of each identified volume (S110). Subsequently, the management program 1759 acquires the storage node(s) 1300 belonging to the secondary site and the configuration of a virtual storage apparatus from the storage node management table 1751 and the virtual storage management table 1758 (S120). Incidentally, when this happens, storage nodes which do not belong to the virtual storage apparatus may be gathered into a set and be treated as if they belonged to the same virtual storage apparatus (default virtual storage apparatus).

Next, the management program 1759 makes an attempt to locate a secondary volume(s) to satisfy the requirement upon failure with respect to each virtual storage apparatus (S130). When the secondary volume can be located, the management program 1759 issues an instruction to the CPU 1330, which executes the control program 1321 for a storage node where the second volume is to be located, to locate the secondary volume. Also, the management program 1759 adds the newly located secondary volume to the volume management table 1752. Moreover, the management program 1759 also updates the available capacity (T130) and the surplus performance (T150) of the storage node in the storage node management table 1751. Furthermore, the management program 1759 registers information of the primary volume corresponding to the located secondary volume in the copy pair management table 1754. Subsequently, when the management program 1759 judges whether the secondary volume has been successfully located or not, and if the secondary volume has been successfully located, the management program 1759 proceeds to S140. If the secondary volume has not been successfully located, the management program 1759 makes an attempt to locate the secondary volume in a next virtual storage apparatus. If the management program 1759 continues failing to locate the secondary volume until the last virtual storage apparatus, the management program 1759: notifies the administrator that the secondary volume cannot be located (S180); and then terminates the processing.

In S140, the management program 1759 issues an instruction to the CPU 1330 to: group the located secondary volumes with respect to each secondary storage node where the secondary volumes are located; and locate a secondary volume group 160. (S140). The configuration of the created volume group is reflected in the volume group management table 1755. Furthermore, when creating a volume group across the storage nodes, the management program 1759 also updates the surplus bandwidth (T750) of the inter-node connection management table 1757. Next, the management program 1759 issues an instruction to the CPU 1330 to identify primary volumes, which correspond to the secondary volumes belonging to each secondary volume group, from the copy pair management table 1754 and create a primary volume group 150 with the identified primary volumes (S150). Then, the management program 1759 updates the volume group management table 1756 according to the created configuration. Furthermore, the management program 1759 issues an instruction to the CPU 1330 to gather the then-located secondary volume groups 160 into one set and create an extended volume group 180 (S160).

When this happens, a master storage node which activates a mediation function is decided to guarantee the update order across the volume groups. There are some possible methods for making this decision; however, the simplest method can be to activate the mediation function at a storage node with the newest ID. Another possible method is, for example, to monitor loads on the storage nodes and activate the mediation function at a storage node with the lowest load. In this example, the mediation function is activated at the storage node with the newest ID, but the master storage node may be decided by other methods.

Then, the management program 1759 updates the extended volume group management table 1758 in accordance with the configuration of the then-created extended volume group 180. Lastly, the management program 1759 issues an instruction to the CPU 1330 to allocate the JNL volume 170 to each volume group and starts remote copying. Places to locate this JNL volume are decided in accordance with JNL management information in the volume group table. Furthermore, the management program 1759 updates the JNL volume ID in the volume group management table on the basis of the location results.

In this embodiment, the volume groups are created so that they do not extend across virtual storage apparatuses. However, a method for allowing creation of a volume group across virtual storage apparatuses may be possible. When executing such processing, it is only necessary to execute the processing in S120 by making all the storage nodes at the secondary site belong to a single virtual storage apparatus without referring to the virtual storage management table 1758.

Furthermore, in order to make the storage nodes 1300, which belong to the extended volume group 180, recognized as one virtual storage apparatus after the restoration, the management program 1759 may issue an instruction to the CPU 1330 at the end of the processing to assign the virtual storage apparatus ID (T810) to the extended volume group 180 and create a virtual storage node with the storage nodes 1300 belonging to the extended volume group. When this happens, the management program 1759 also updates the virtual storage management table (1458).

Figure 12:
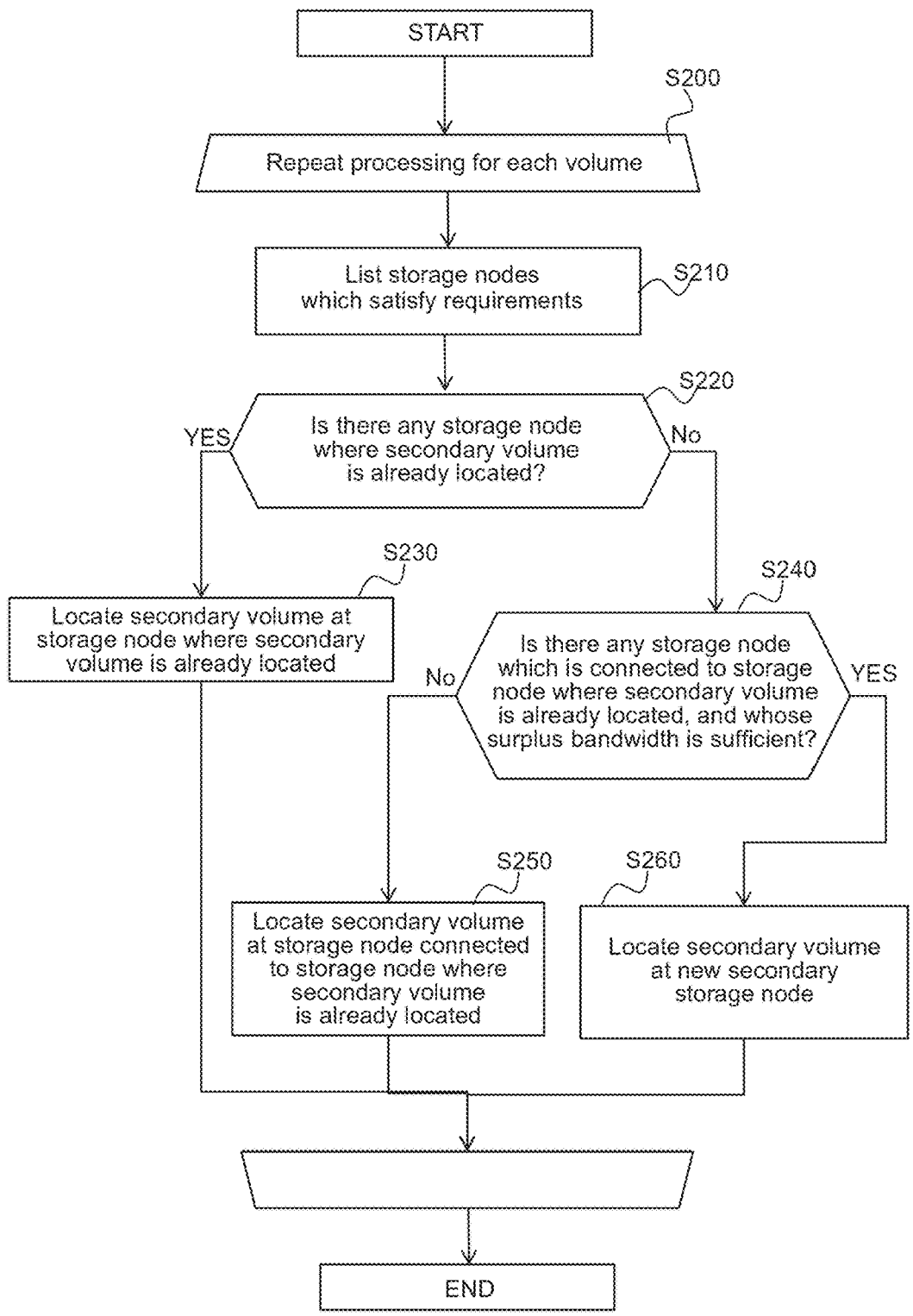
FIG. 12 is a flow illustrating an example of a processing sequence for selecting a storage node to locate a secondary volume when constructing the remote copy configuration.

FIG. 12 illustrates an example of processing for creating a more efficient remote copy configuration in S130 of FIG. 11. In this processing, the processing is executed repeatedly for each primary volume (S200). Firstly, the CPU 1730 lists the storage nodes 1300 which satisfy the performance requirement (T340) of the secondary volume corresponding to the primary volume (S210). The storage nodes 1300 are listed by selecting those which satisfy the performance requirement (T340) that requires the available capacity (T130) and the surplus performance (T150) of the storage node management table 1751. Next, the CPU 1730 judges whether or not any storage node in which the secondary volume(s) has already been located by the current processing exists in the listed storage nodes (S220). When such storage node exists, the CPU 1730 issues an instruction to the CPU 1330 to locate the secondary volume in that storage node. Then, the CPU 1730 proceeds to the processing on the next primary volume (S230).

When the storage node in which the secondary volume(s) has already been located does not exist in the listed storage nodes, the CPU 1730 checks whether or not a storage node connected with a sufficient bandwidth to the storage node, in which the secondary volume(s) has already been located, exists among the listed storage nodes. More specifically speaking, a storage node(s) connected to the storage node which satisfies the performance requirement (T340) required for the secondary volume is identified from the inter-node connection management table 1758. Then, the storage nodes in which the secondary volumes are located are narrowed down from among the identified storage nodes when constructing the current remote copy configuration. Furthermore, the CPU 1730 judges whether or not a storage node which has sufficient surplus bandwidth (T820) for the connection with the narrowed-down storage node exists among the storage nodes which satisfy the requirement for the secondary volume (S240). In order to judge whether the surplus bandwidth is sufficient or not, whether the surplus bandwidth is sufficient or not is judged based on the performance requirement (T340) in the host computer management table 1758 when the performance is input and even if an equal amount of data flows through a channel of the inter-node connection 1380. Incidentally, when a ratio of inputs to outputs is known, the judgment may be made by estimating the amount of data which will flow through the channel at such ratio.

When there is a sufficient bandwidth, the CPU 1730 issues an instruction to the CPU 1330 to locate the secondary volume in the storage node (S250). When the relevant storage node does not exist, the CPU 1730 issues an instruction to the CPU 1330 to select one storage node from among the storage nodes, which satisfy the performance requirement (T340), and locate the secondary volume (S260). Under this circumstance, there are some possible methods for selecting the storage node and, for example, a method of selecting a storage node with the highest available capacity and the highest surplus performance or a method of randomly selecting a storage node can be used.

The above-described processing can prevent the extended volume group 180 from being dispersed and configured between the storage nodes 1300 to the extent possible. Input/output data and management data to make the storage apparatuses recognized as a virtually single storage apparatus flow through the network between the storage apparatuses. Therefore, data transfer for remote copying competes with such flow of the input/output data and the management data and can thereby prevent degradation of input/output performance of the storage apparatuses and the performance of the remote copying.

Figure 13:
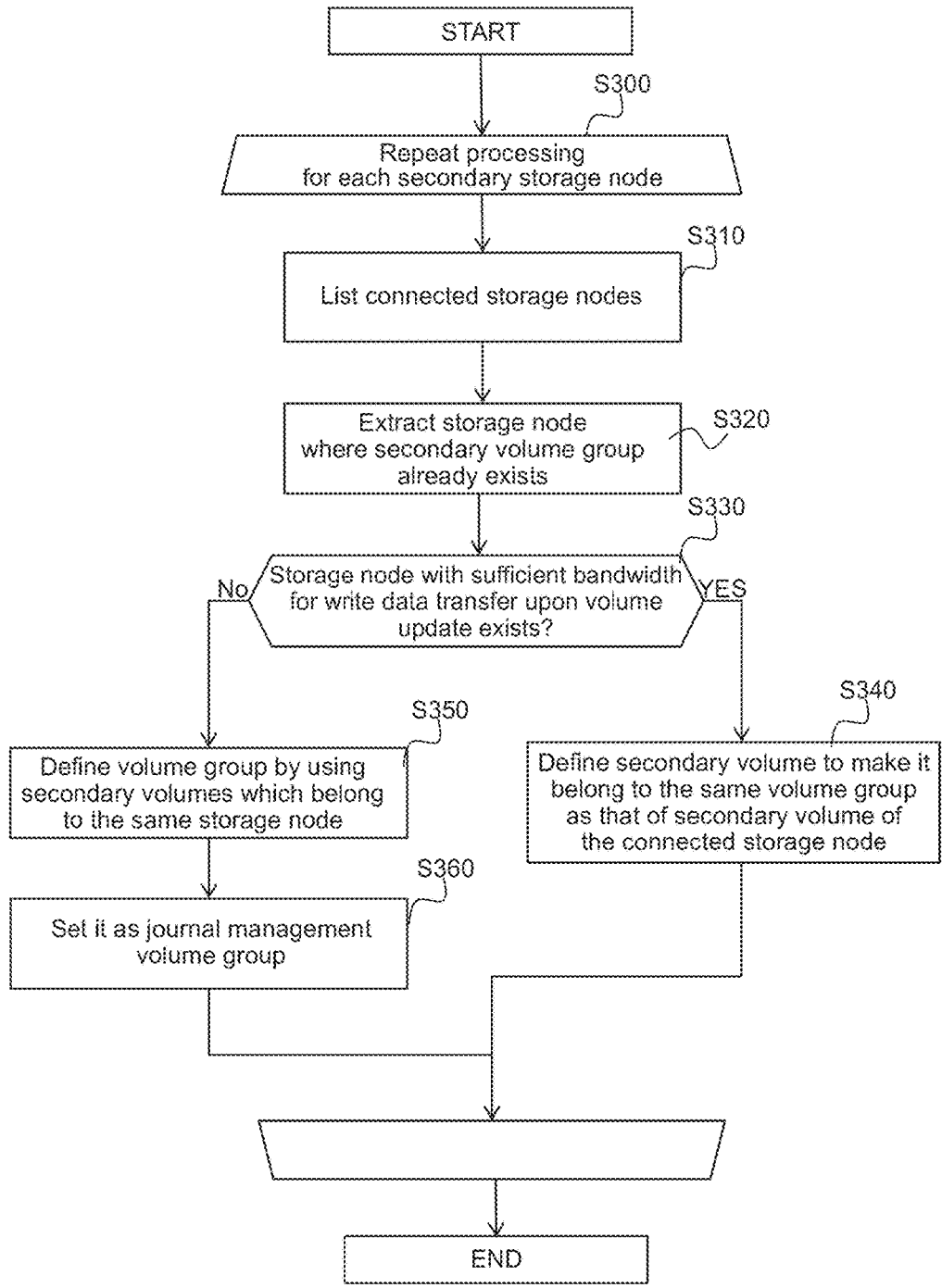
FIG. 13 is a flow illustrating an example of a processing sequence for determining the secondary volume which belongs to a volume group when constructing the remote copy configuration.

FIG. 13 illustrates an example of the processing for creating a more efficient remote copy configuration in S140 in FIG. 11. Regarding this processing in S140, the processing is executed repeatedly for each secondary storage apparatus 140 in which the secondary volumes are installed (S300). The CPU 1730 firstly refers to the inter-node connection management table 1758 and lists storage nodes connected to a secondary storage node which is a target of the processing (S310). Next, the CPU 1730 narrows down the storage nodes 1300 to which a secondary volume group 160 has already been set by the current remote copy configuration processing, from among the listed storage nodes (S320). Next, the CPU 1730 judges whether the connection between the secondary storage node, which is the processing target, and the narrowed-down storage nodes has a sufficient bandwidth or not, on the basis of the surplus bandwidth (T750) in the inter-node connection management table 1757 (S330).

When the surplus bandwidth is sufficient, the CPU 1730 issues an instruction to the CPU 1330 to make the secondary volumes of the processing target storage node belong to the secondary volume group 160 which has already been set (S340). When there is no storage node with a sufficient surplus bandwidth, the CPU 1730 issues an instruction to the CPU 1330 to create a secondary volume group 160 with the secondary volumes which are set in the secondary storage node that is the processing target (S350). Then, the CPU 1730 issues an instruction to the CPU 1330 to manage the journal at that secondary storage node (S360).

Even if the secondary volumes for the primary volumes provided to one host computer are dispersed in different storage nodes, the above-described processing can set them as the same volume group as long as the connection between the storage nodes is established with sufficient performance. As a result, the number of JNL volumes 170 in the extended volume group 180 can be reduced, so that wasteful resources can be reduced.

Incidentally, when the management information is updated by new settings during each processing illustrated in FIG. 12 and FIG. 13 in the same manner as in FIG. 11, the information of the management tables illustrated from FIG. 3 to FIG. 10 will be updated.

Furthermore, regarding this processing, a storage node which performs journal management is the first storage node for creating a secondary volume group to which the storage node belongs (S360); however, when configuring more complicated storage nodes, a storage node with the smallest amount of data transfer may be made to perform journal management according to the network configuration.

The configuration of this embodiment makes it possible to set a small number of volume groups which satisfy the performance requirement required after the restoration and do not extend across the storage nodes as much as possible in the environment where there are differences in the performance and capacity of the storage apparatuses between the site where the business is conducted in normal times and the restoration site. Since the management of the JNL volumes is required for each volume group, a smaller number of volume groups makes it possible to reduce management man-day and the resources used for the management.

Embodiment 2

Example 1 dealt with the configuration where the primary site is composed of a single storage node. In this embodiment, it is assumed that the primary site is composed of a plurality of storage apparatuses. Specifically speaking, it is a case where a duplicate for which the update order is guaranteed is created at the secondary site across the plurality of storage apparatuses at the primary site, for example, when a single virtual storage apparatus is created from the plurality of storage nodes at the primary site.

Figure 14:
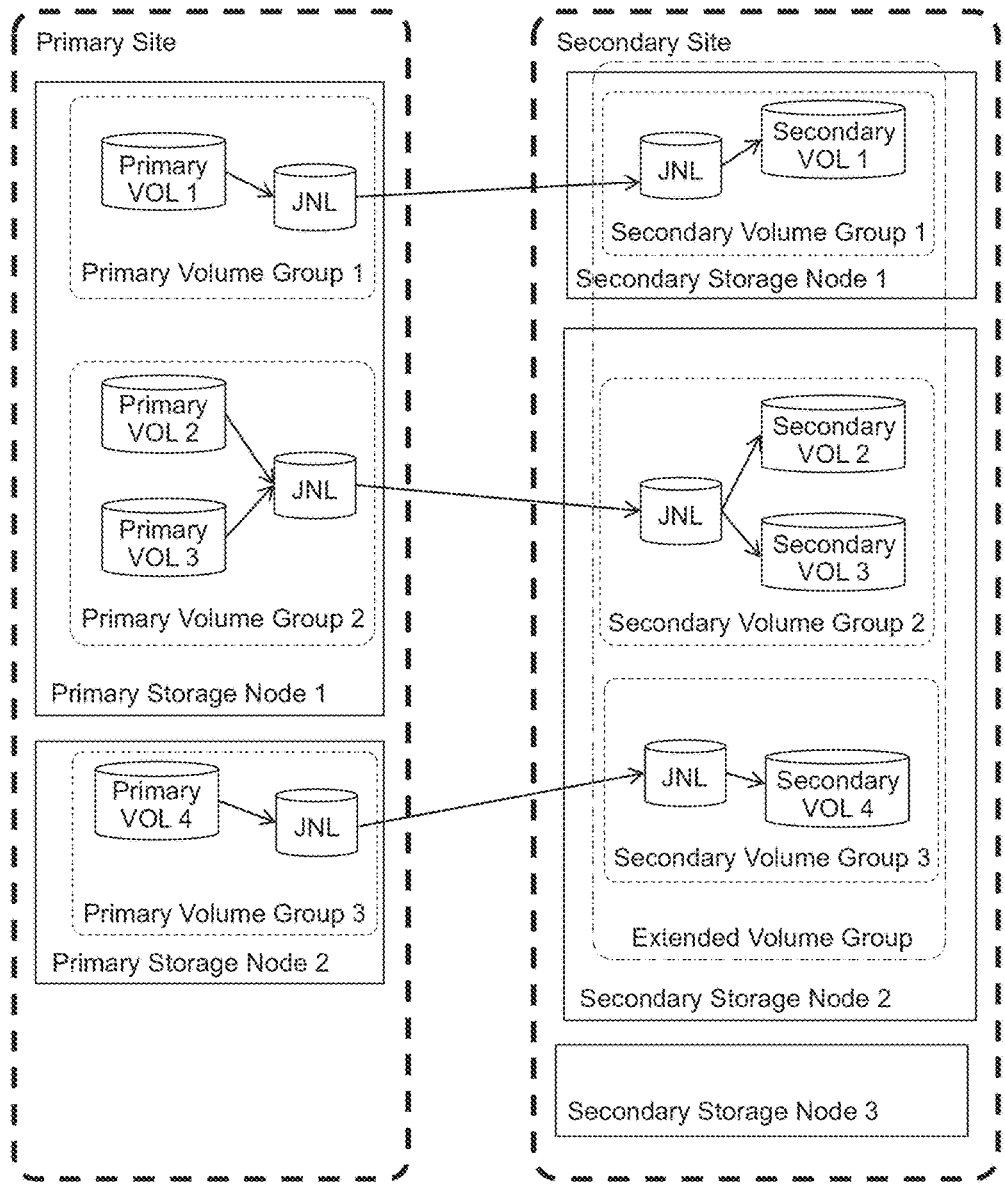
FIG. 14 is a configuration example of a computer system according to a second embodiment to which the present invention is applied.

FIG. 14 is a diagram illustrating a configuration example of storage nodes in this embodiment. In this configuration, a plurality of primary storage nodes belong to the primary site. The update order is guaranteed across volumes provided by the plurality of storage nodes.

Remote copy configuration constructing processing in this configuration is basically the same as the processing illustrated in FIG. 11. However, the CPU 1730 executes S100 to S150 in FIG. 11 with respect to each primary storage node. Then, in S160, the CPU 1730 issues an instruction to the CPU 1330 to create an extended volume group with secondary volume groups created by the processing in S100 to S150 executed on all the primary storage nodes.

As a result, the extended volume group to which all the secondary volume groups belong can be created after different volume groups are created for the respective primary storage apparatuses. The configuration indicated in this embodiment makes it possible to create a remote copy configuration where a duplicate with the update order guaranteed across the plurality of storage apparatuses at the primary site is created at the secondary site in the environment where there are differences in the performance and capacity of the storage apparatuses between the site where the business is conducted in normal times and the restoration site.

Embodiment 3

Figure 15:
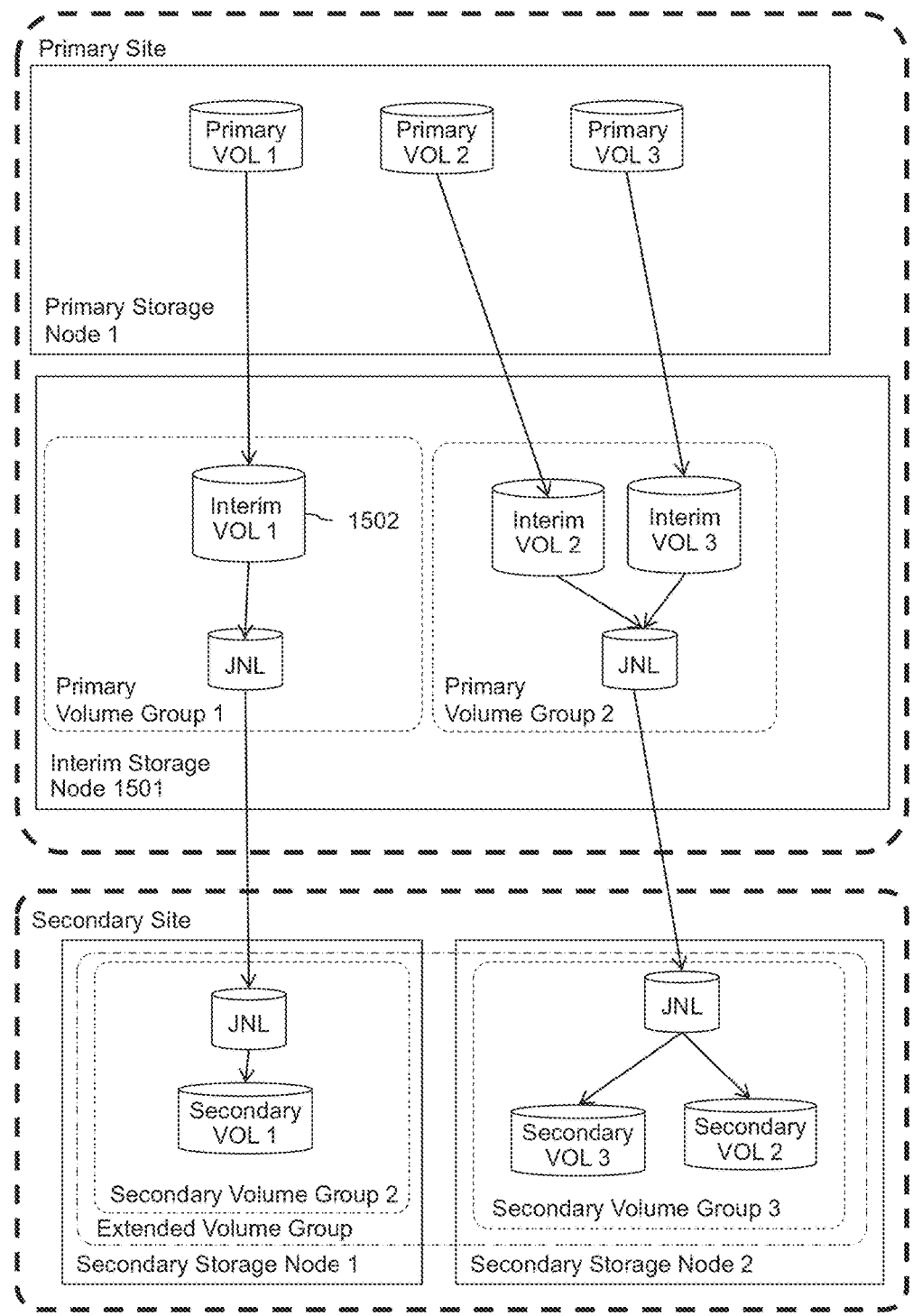
FIG. 15 is a configuration example of a computer system according to a third embodiment to which the present invention is applied.

In Example 1 and Example 2, it is required, depending on the configuration of volume groups created at the secondary site, to set a plurality of volume groups in a storage node(s) at the primary site. However, if the number of volume groups increases, the resources will be consumed as much as the increase, which will impose load on the storage apparatuses. This embodiment indicates the configuration to avoid division of a volume group at the storage node where the business is conducted, by installing an interim storage node between the storage node where the business is conducted and the storage node where the restoration will be performed. FIG. 15 illustrates a configuration example of the storage nodes in this embodiment. In this configuration, an interim storage node 1501 is added to the primary site. Then, synchronous remote copying is performed between the primary storage node and the interim storage node 1501.

During the synchronous remote copy processing, when a storage node connected to the host computer receives a write command from the host computer, it transfers write data to a storage node which is a replication destination. Then, after write processing is completed at both the storage node connected to the host computer and the storage node which is the replication destination, a response to the write command is returned to the host computer. Accordingly, it is guaranteed that data at both the storage nodes will be always synchronized.

In this embodiment, a volume which stores replicated data created by this synchronous remote copying is called an interim volume 1502.

After this synchronous remote copy is created, the remote copy configuration indicated in Example 1 which uses journals is constructed for the interim volume 1502. Remote copy configuration constructing processing is basically the same as in FIG. 11. However, after receiving a remote copy construction instruction from the administrator, the CPU 1730 firstly needs to select a storage node for an interim site and create the configuration of the synchronous remote copy. For the selection of the storage node for this occasion, for example, a method of selecting a storage node which satisfies the performance from the performance requirement for the primary volume is used. Then, the processing in FIG. 11 is executed by treating the interim volume as the primary volume on the basis of the constructed synchronous remote copy configuration.

The configuration of this embodiment makes it possible to construct an extended volume group across a plurality of storage nodes at the secondary site without consuming resources for the primary storage node. As a result, the resource consumption of the primary storage node can be suppressed. Incidentally, in this embodiment, the interim storage node is installed at the primary site; however, as another embodiment, the interim storage node may be installed at another third site or at the secondary site. Furthermore, in this embodiment, the relationship between the primary storage node and the interim storage node is configured by means of synchronous remote copying, but may be configured by means of remote copying using the journals.

The invention claimed is:

1. A management method for a computer system including at least one first storage apparatus and a plurality of second storage apparatuses, the management method comprising:

managing performance information and available capacity information of the plurality of second storage apparatuses and required performance upon failure of a plurality of first volumes in the at least one first storage apparatus;

locating a plurality of second volumes in the second storage apparatuses capable of satisfying the required performance upon failure of the plurality of first volumes, on the basis of the performance information and the available capacity information of the second storage apparatuses;

setting the plurality of second volumes in the plurality of second storage apparatuses to form remote copy pairs with the plurality of first volumes provided by the at least one first storage apparatus;

configuring a second volume group for each of the second volumes located in each of the second storage apparatuses, respectively, and at least one first volume group for the first volumes constituting the remote copy pairs with such second volumes;

setting a first extended volume group including the plurality of first volumes and a second extended volume group including the plurality of second volumes;

setting a journal volume for each second volume group, respectively; and replicating and recording data, which are stored in the plurality of first volumes, between the plurality of second volumes included in the second extended volume group in a write order of the data stored to the plurality of first volumes by using the respective journal volume for each second volume group, wherein the plurality of second storage apparatuses constitute one virtual storage apparatus, and wherein the second volumes are located preferentially in the second storage apparatus in which any one of the second volumes has already been allocated, among the plurality of second storage apparatuses.

2. The management method according to claim 1, wherein the plurality of first volumes are provided, as targets of an input-output request, to one computer.

3. The management method according to claim 1, wherein bandwidth information between the plurality of second storage apparatus is managed; and wherein the second volumes are located in the second storage apparatus connected to the second storage apparatus in which any one of the second volumes has already been allocated, with a bandwidth which satisfies the performance requirement upon failure of the first volumes.

4. The management method according to claim 1, wherein an area to store information for guaranteeing the write order of the data in each second volume group is secured in each second volume group.

5. The management method according to claim 1, wherein when the at least one first storage apparatus is provided in plurality, the at least one first volume group is set to not extend across plural first storage apparatuses.

6. The management method according to claim 1, wherein the computer system further includes a third storage apparatus connected to the first storage apparatus;

wherein each of the first volumes forms a remote copy with a volume provided by the third storage apparatus; and wherein the volume provided by the third storage apparatus is a volume to be provided to the computer.

7. The management method according to claim 1, wherein the step of locating the plurality of second volumes in the second storage apparatuses capable of satisfying the required performance is based at least upon a surplus performance of the second storage apparatuses.

8. The management method according to claim 1, further comprising:

configuring the plurality of second storage apparatuses as a virtual storage apparatus.

9. A computer system comprising at least one first storage apparatus, a plurality of second storage apparatuses, and a management apparatus including a control unit and a storage unit, wherein the storage unit manages performance information and available capacity information of the plurality of second storage apparatuses and required performance upon failure of a plurality of first volumes in the at least one first storage apparatus; and wherein the control unit:

locates a plurality of second volumes in the second storage apparatuses capable of satisfying the required performance upon failure of the plurality of first volumes, on the basis of the performance information and the available capacity information of the second storage apparatuses;

sets the plurality of second volumes in the plurality of second storage apparatuses to form remote copy pairs with the plurality of first volumes provided by the at least one first storage apparatus;

configures a second volume group for each of the second volumes located in each of the second storage apparatuses, respectively, and at least one first volume group for the first volumes constituting the remote copy pairs with such second volumes;

sets a first extended volume group including the plurality of first volumes and a second extended volume group including the plurality of second volumes;

sets a journal volume for each second volume group; and replicates and records data, which are stored in the plurality of first volumes, between the plurality of second volumes included in the second extended volume group in a write order of the data stored to the plurality of first volumes by using the respective journal volume for each second volume group, wherein the plurality of second storage apparatuses constitute one virtual storage apparatus, and wherein the control unit locates the second volumes preferentially in the second storage apparatus in which any one of the second volumes has already been allocated, among the plurality of second storage apparatuses.

10. The computer system according to claim 9, wherein the plurality of first volumes are provided, as targets of an input-output request, to one computer.

11. The computer system according to claim 9, wherein the control unit:

manages bandwidth information between the plurality of second storage apparatuses; and locates the second volumes in the second storage apparatus connected to the second storage apparatus in which any one of the second volumes has already been allocated, with a bandwidth which satisfies the performance requirement upon failure of the first volumes.

12. The computer system according to claim 9, wherein an area to store information for guaranteeing the write order of the data in each second volume group is secured in each second volume group.

13. The computer system according to claim 9, wherein when the at least one first storage apparatus is provided in plurality, the control unit sets the at least one first volume group to not extend across plural first storage apparatuses.

14. The computer system according to claim 9, further comprising a third storage apparatus connected to the first storage apparatus, wherein each of the first volumes forms a remote copy with a volume provided by the third storage apparatus; and wherein the volume provided by the third storage apparatus is a volume to be provided to the computer.

15. The computer system according to claim 9, wherein the control unit locates the plurality of second volumes in the second storage apparatuses capable of satisfying the required performance based at least upon a surplus performance of the second storage apparatuses.

16. The computer system according to claim 9, wherein the plurality of second storage apparatuses are configured as a virtual storage apparatus.

* * * * *